United States Patent
Wang et al.

(10) Patent No.: US 11,827,751 B2
(45) Date of Patent: Nov. 28, 2023

(54) NANONETWORK WITH CONTROLLED CHIRALITY AND MANUFACTURING METHOD THEREOF

(71) Applicant: NATIONAL TSING HUA UNIVERSITY, Hsinchu (TW)

(72) Inventors: Hsiao-Fang Wang, Hsinchu (TW); Po-Ting Chiu, Hsinchu (TW); Chih-Ying Yang, Hsinchu (TW); Zhi-Hong Xie, Hsinchu (TW); Yu-Chueh Hung, Hsinchu (TW); Jing-Yu Lee, Chiayi (TW); Jing-Cherng Tsai, Chiayi (TW); Ishan Prasad, Amherst, MA (US); Hiroshi Jinnai, Aoba-ku (JP); Edwin L. Thomas, Houston, TX (US); Rong-Ming Ho, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 139 days.

(21) Appl. No.: 17/501,315

(22) Filed: Oct. 14, 2021

(65) Prior Publication Data
US 2022/0411590 A1  Dec. 29, 2022

(30) Foreign Application Priority Data
Jun. 29, 2021 (TW) .................................. 110123667

(51) Int. Cl.
*C08G 81/02* (2006.01)

(52) U.S. Cl.
CPC .................................. *C08G 81/027* (2013.01)

(58) Field of Classification Search
CPC .................................................. C08G 81/027
See application file for complete search history.

(56) References Cited

U.S. PATENT DOCUMENTS

| | | | |
|---|---|---|---|
| 7,135,523 | B2 | 11/2006 | Ho et al. |
| 2021/0161645 | A1* | 6/2021 | Rocco ..................... D04C 1/06 |

FOREIGN PATENT DOCUMENTS

| | | | |
|---|---|---|---|
| CN | 109983059 A | | 7/2019 |
| CN | 115428726 | * | 12/2022 |
| WO | WO 2021193674 | * | 3/2021 |

OTHER PUBLICATIONS

Wu e al., Synthesis, characterization and biocompatibility of novel biodegradable poly[((R)-3-hydroxybutyrate)-block-(D,Llactide)-block-(ε-caprolactone)] triblock copolymers, Polym Int 57:939-949 (2008).*
Electronic translation of Zhou et al. (CN 115428726), Dec. 2022.*
Electronic translation of Baba (WO 2021193674), Mar. 2021.*
Hsiao-Fang Wang et al., Networks with controlled chirality via self-assembly of chiral triblock terpolymers:, Science Advances, Oct. 14, 2020, vol. 6, pp. 1-9.

* cited by examiner

*Primary Examiner* — Jeffrey C Mullis
(74) *Attorney, Agent, or Firm* — MCBEE MOORE & VANIK IP, LLC

(57) ABSTRACT

A nanonetwork with controlled chirality prepared via self-assembly of triblock terpolymers, wherein each of the triblock terpolymers includes a first block, a second block and a third block. The first block is connected to the second block, and the third block is connected to the second block. The first block, the second block and the third block are incompatible. The third block has a homochiral characteristic, and a chirality of the nanonetwork with controlled chirality is determined by the homochiral characteristic.

7 Claims, 8 Drawing Sheets

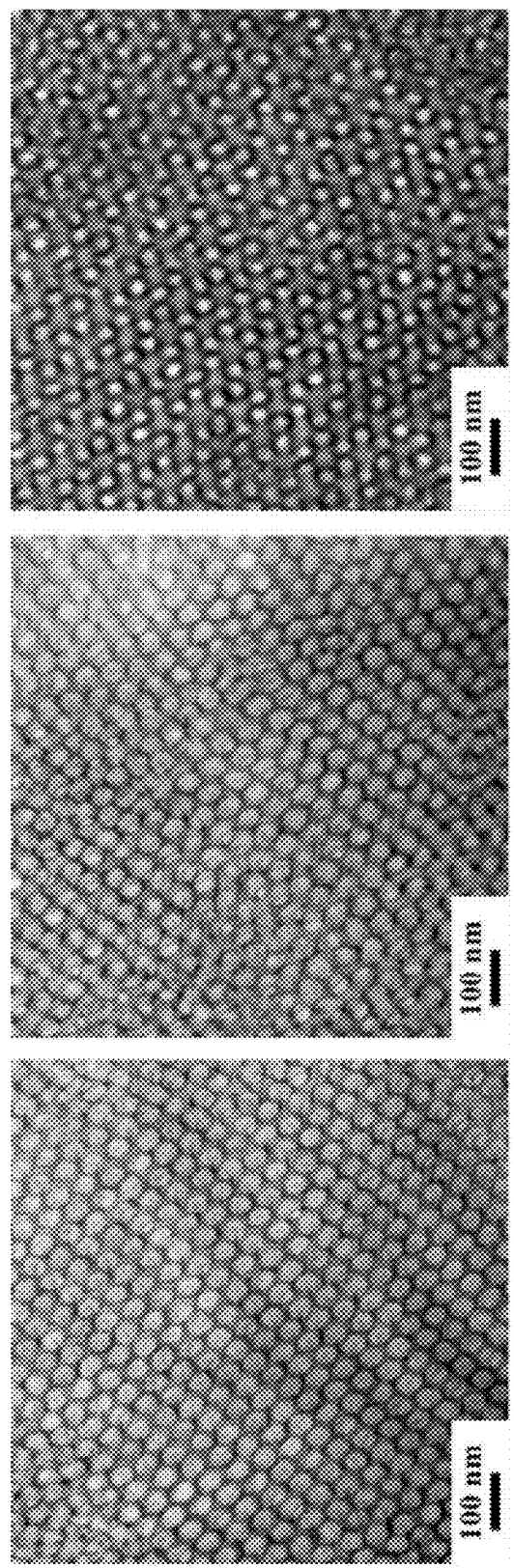

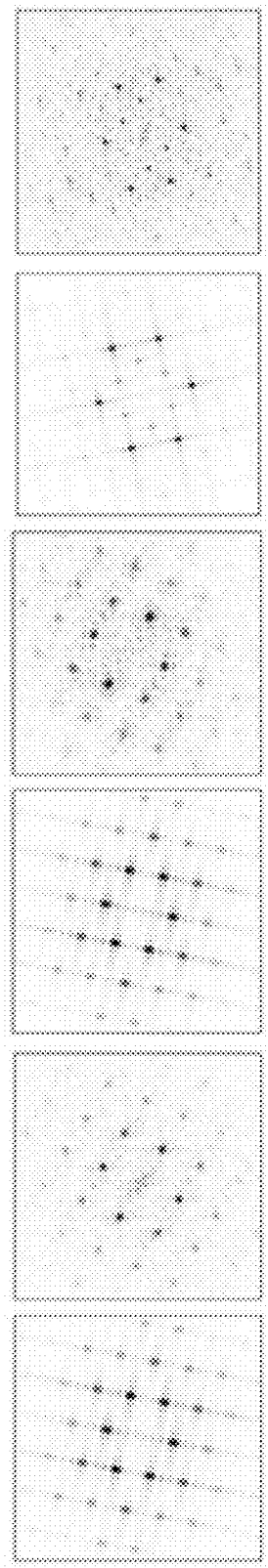

US 11,827,751 B2

NANONETWORK WITH CONTROLLED CHIRALITY AND MANUFACTURING METHOD THEREOF

RELATED APPLICATIONS

This application claims priority to Taiwan Application Serial Number 110123667, filed Jun. 29, 2021, which is herein incorporated by reference.

BACKGROUND

Technical Field

The present disclosure relates to a network and a manufacturing method thereof. More particularly, the present disclosure relates to a nanonetwork with controlled chirality and a manufacturing method thereof.

Description of Related Art

Network-structured materials can be found in nature and synthetic materials. A double gyroid (DG) with a pair of chiral networks is the best known. In general, the double gyroid is formed by two networks of diblock copolymers. However, the two networks with same characteristic are hard to separate. By using self-assembled triblock terpolymers, alternating gyroid can be obtained to isolate the two networks, but the network chirality could be positive or negative arbitrarily. Further, most fabrication approaches for network-structured materials today rely on top-down approaches. Yet, there is a limitation on the overall size of the nanostructured materials produced from top-down methods, and the process of top-down methods is high-cost and time-consuming.

Therefore, efficiently preparing a nanoscale network and controlling the chirality of nanonetwork has become one of the goals worth investigating in the relevant fields.

SUMMARY

According to one aspect of the present disclosure, a nanonetwork with controlled chirality prepared via self-assembly of triblock terpolymers, wherein each of the triblock terpolymers includes a first block, a second block and a third block. The first block is connected to the second block, and the third block is connected to the second block. The first block, the second block and the third block are incompatible. The third block has a homochiral characteristic, and a chirality of the nanonetwork with controlled chirality is determined by the homochiral characteristic.

According to another aspect of the present disclosure, a method for manufacturing the nanonetwork with controlled chirality according to above-mentioned aspect. In the method, the triblock terpolymers are provided, and the triblock terpolymers are added in a solvent, wherein the triblock terpolymers self-assemble in the solvent during evaporation to form the nanonetwork with controlled chirality.

These and other features, aspects, and advantages of the present disclosure will become better understood with reference to the following description and appended claims.

BRIEF DESCRIPTION OF THE DRAWINGS

The present disclosure can be more fully understood by reading the following detailed description of the embodiment, with reference made to the accompanying drawings as follows:

FIG. 3A is a TEM image of EX1.
FIG. 3B is a TEM image of EX2.
FIG. 3C is a TEM image of COM1.
FIG. 4A is a simulated FFT result of FIG. 3A.
FIG. 4B is an experimental FFT result of FIG. 3A.
FIG. 4C is a simulated FFT result of FIG. 3B.
FIG. 4D is an experimental FFT result of FIG. 3B.
FIG. 4E is a simulated FFT result of FIG. 3C.
FIG. 4F is an experimental FFT result of FIG. 3C.

DETAILED DESCRIPTION

The present disclosure provides a nanonetwork with controlled chirality prepared via self-assembly of triblock terpolymers. The triblock terpolymers are chiral, wherein each of the triblock terpolymers includes a first block, a second block and a third block. The first block is connected to the second block, and the third block is connected to the second block. The first block, the second block and the third block are incompatible. The third block has a homochiral characteristic, and a chirality of the nanonetwork with controlled chirality is determined by the homochiral characteristic.

Figure 1:
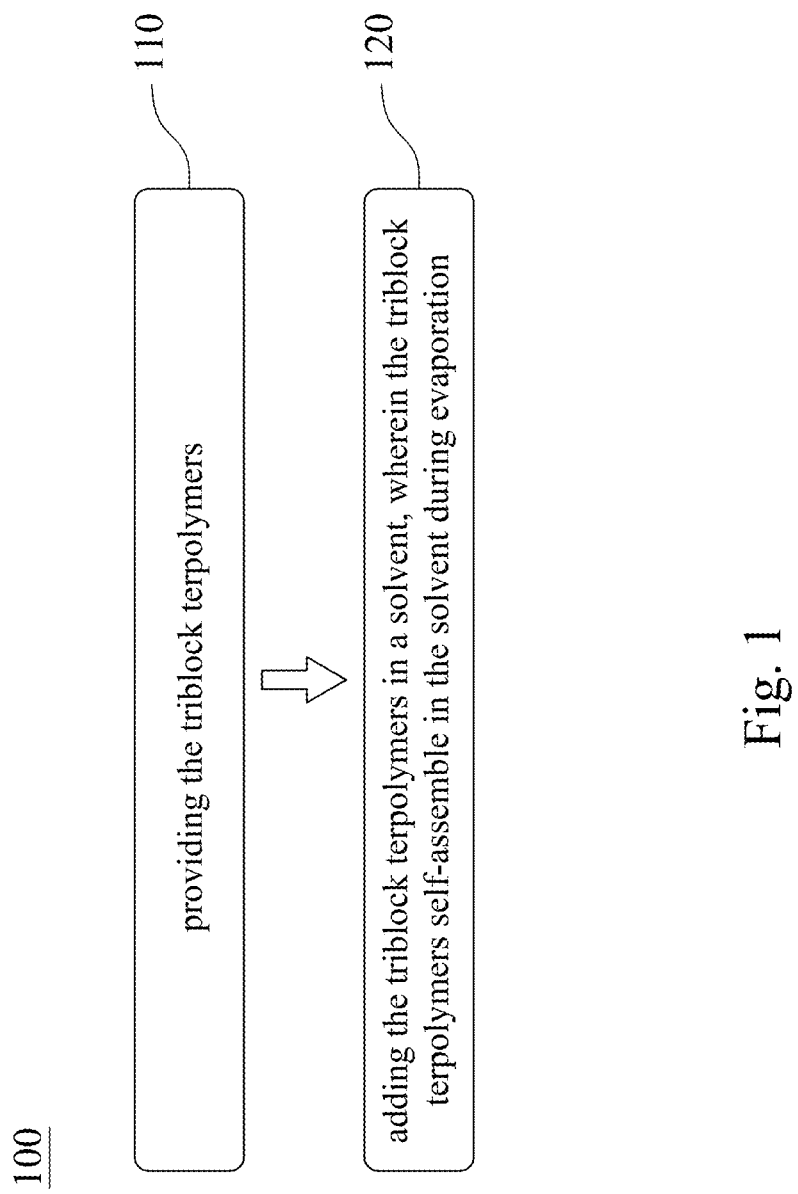
FIG. 1 is a flowchart of a method for manufacturing the nanonetwork with controlled chirality according to an embodiment of the present disclosure.

Another embodiment of the present disclosure provides a method 100 for manufacturing the nanonetwork with controlled chirality mentioned above. Please refer to FIG. 1. FIG. 1 is a flowchart of a method 100 for manufacturing the nanonetwork with controlled chirality according to an embodiment of the present disclosure. The method 100 for manufacturing the nanonetwork with controlled chirality includes Step 110 and Step 120.

In Step 110, the triblock terpolymers are provided. In Step 120, the triblock terpolymers are added in a solvent, and the triblock terpolymers self-assemble in the solvent during evaporation to form the nanonetwork with controlled chirality, wherein the solvent can be dichloromethane, toluene or chloroform.

Specifically, by carefully choosing the composition of the first block, the second block and the third block, the triblock terpolymers are automatically arranged into a well-ordered nanostructure from the microphase separation that occurred in each block. Further, to access the nanonetwork with controlled chirality, the triblock terpolymer uses the third block with homochiral characteristic as the end block, at the situation that the chirality of the third block is confirmed, by taking advantage of chiral information transfer at different length scales, the chirality of the nanonetwork with controlled chirality can be determined by the homochiral characteristic of the third block.

Specifically, the first block can be polyisobutylene (PIB), polypropylene (PP), polyisoprene (PI), polyethylene (PE), polybutadiene (PB) or polyoxypropylene (PPG). The second block can be poly(2-chloro-1,3-butadiene) (Neoprene), poly (isobutyl acrylate), poly(butyl vinyl ether), polystyrene (PS), poly(methyl vinyl ether), poly(ethyl methacrylate) (PEMA), poly(α-methylstyrene), poly(2-ethoxyethyl methacrylate), poly(vinyl propionate), poly(vinyl butyrate) or poly(propyl acrylate) (PPA).

On the other hand, a volume fraction of the third block of each of the triblock terpolymers can be 0.45 to 0.57. In detail, a volume fraction of the first block can be 0.15±0.2, a volume fraction of the second block can be 0.35±0.2, and the volume fraction of the third block can be 0.50±0.2. When the condition mentioned above is satisfied, this large asymmetry in constituted compositions, particularly with the largest volume fraction of the third block, might be essential to control the chirality of the triblock terpolymer.

Specifically, the first block forms a first gyroid in the nanonetwork with controlled chirality, the third block forms a second gyroid in the nanonetwork with controlled chirality, the second gyroid is intertwined with the first gyroid, and the second block serves as a matrix component for the first gyroid and the second gyroid. By carefully choosing the composition of the first block, the second block and the third block, such that the second block is the matrix component and the first block and the third block are the dispersive components, to assure that the first block and the third block will form their own multi-chain domain network and monomeric chirality transfer occurs, the nanonetwork with controlled chirality can be obtained. Further, when the condition mentioned above is satisfied, the nanonetwork with controlled chirality can be an alternating gyroid, and the nanonetwork with controlled chirality has a nanochannel, wherein a diameter of the nanochannel can be 8 nm to 30 nm.

Therefore, the nanonetwork with controlled chirality of present disclosure has the properties of adjustable pore size (micropores to mesopores) and well-ordering. Further, in the method 100 for manufacturing the nanonetwork with controlled chirality of present disclosure, the chemical structure of each block and the solvent used can be selected according to the requirements of the process, and the present disclosure will not be limited therein.

The well-defined nanoporous polymers with single gyroid nanochannel can be fabricated by the method 100 for manufacturing the nanonetwork with controlled chirality of present disclosure and used for templated syntheses, such as templated atomic layer deposition, electrochemical deposition, sol-gel reaction and electroless plating to give well-ordered nanohybrid materials. Such materials are promising candidates for chiroptic metamaterials such as chiral beam splitter, negative refraction and collimation effect.

It is worth to be mentioned that most fabrication approaches for metamaterials today rely on top-down approaches. Yet, there is a limitation on the overall size of the nanostructured materials produced from top-down methods, and the process is time-consuming. Further, the network prepared by an achiral block copolymer, due to unparticular chirality, the networks in each grain of the structure can arbitrarily exhibit either positive or negative chirality, limiting the application and development of metamaterials.

In contrast, by taking advantage of the composition and configuration of the first block, the second block and the third block, the nanonetwork with controlled chirality of present disclosure can be prepared via self-assembly of triblock terpolymers. Not only the manufacturing process can be more efficient, but also the network with nanoscale can be manufactured. Furthermore, the chirality of the network can be controlled, which can solve the weaknesses of the current technology, and the problem in the field of metamaterials can be broke through.

Reference will now be made in detail to the present embodiments of the present disclosure, examples of which are illustrated in the accompanying drawings.

The present disclosure provides a nanonetwork with controlled chirality of Example 1 (hereinafter referred to as EX1) and a nanonetwork with controlled chirality of Example 2 (hereinafter referred to as EX2). EX1 is composed via self-assembly of polyisoprene-b-polystyrene-b-poly(L-lactide) (PI-b-PS-b-PLLA). EX2 is composed via self-assembly of polyisoprene-b-polystyrene-b-poly(D-lactide) (PI-b-PS-b-PDLA). In order to describe the characteristics of the present disclosure more specifically, a network of Comparative Example 1 (hereinafter referred to as COM1) is provided. COM1 is composed of polyisoprene-b-polystyrene-b-poly(D,L-lactide) (PI-b-PS-b-PLA) which is an achiral triblock terpolymer.

Please refer to Table 1. The chemical properties of EX1, EX2 and COM1 are shown in Table 1.

TABLE 1

| Samples | $Mn^a$ | $Đ^b$ | $f^a$ | | | $Mn^a$ | | |
|---|---|---|---|---|---|---|---|---|
| | | | PI | PS | PLA | PI | PS | PLA |
| EX1 | 41300 | 1.03 | 0.16 | 0.36 | 0.48 | 4900 | 13300 | 23100 |
| EX2 | 44600 | 1.05 | 0.14 | 0.34 | 0.52 | 4900 | 13300 | 26400 |
| COM1 | 42900 | 1.05 | 0.15 | 0.35 | 0.50 | 4900 | 13300 | 24700 |

Figure 2:
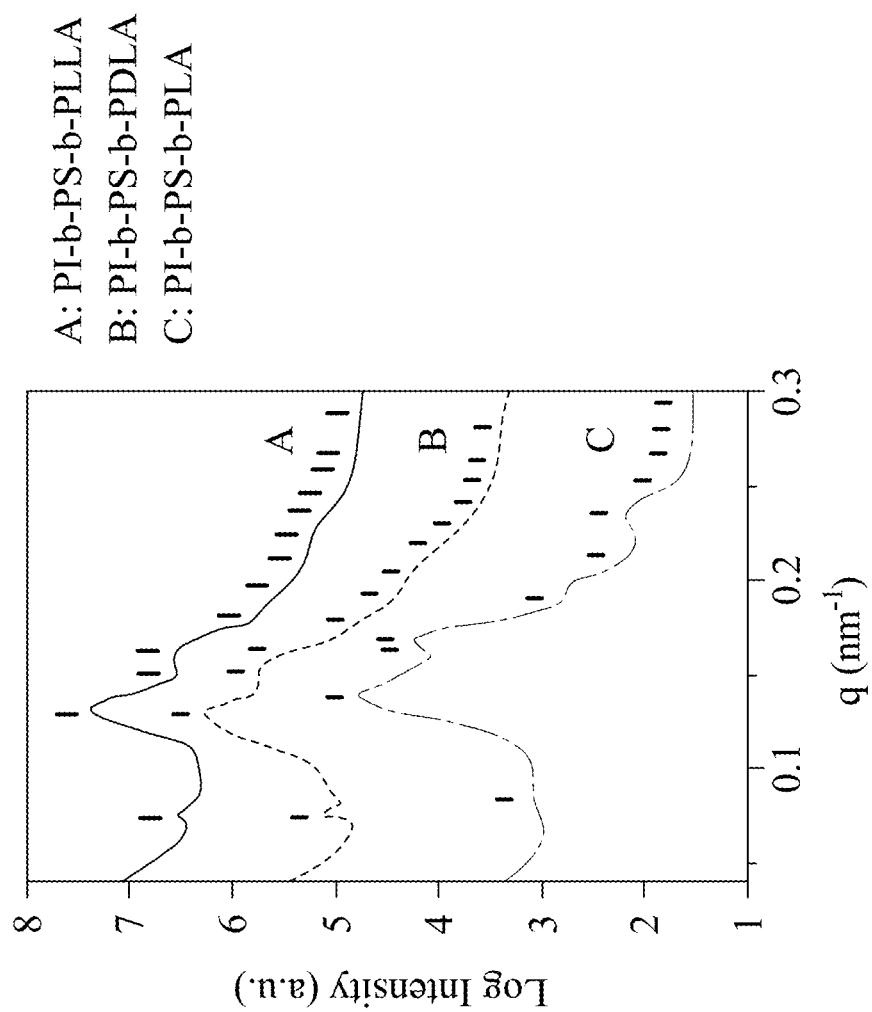
FIG. 2 is a SAXS image of EX1, EX2 and COM1.

Please refer to FIG. 2. FIG. 2 is a SAXS image of EX1, EX2 and COM1. In detail, FIG. 2 shows small-angle X-ray scattering (SAXS) results of EX1, EX2 and COM1. In FIG. 2, the result of PI-b-PS-b-PLLA is similar to the result of PI-b-PS-b-PDLA, and two reflections in the low q region at the relative q value of $\sqrt{2}:\sqrt{6}$ can be found. Those results suggest that the network structure of EX1 and EX2 are alternating gyroid. In contrast to EX1 and EX2, the result of COM1 shows two reflections in the low q region at the relative q values of $\sqrt{3}:\sqrt{8}$, which suggests that the network structure of COM1 is an alternating diamond.

Please refer to FIGS. 3A to 3C and FIGS. 4A to 4F. FIG. 3A is a TEM image of EX1. FIG. 3B is a TEM image of EX2. FIG. 3C is a TEM image of COM1. FIG. 4A is a simulated FFT result of FIG. 3A. FIG. 4B is an experimental FFT result of FIG. 3A. FIG. 4C is a simulated FFT result of FIG. 3B. FIG. 4D is an experimental FFT result of FIG. 3B. FIG. 4E is a simulated FFT result of FIG. 3C. FIG. 4F is an experimental FFT result of FIG. 3C. The term FFT mentioned above is an abbreviation of fast Fourier transform. To unambiguously determine the self-assembled phase, it is necessary to combine the experimental results from the reciprocal-space imaging from SAXS and the real-space imaging from electron microscopy the phase identification.

The network structure of EX1, EX2 and COM1 is examined by using Transmission Electron Microscopy (TEM), and the results are shown in FIGS. 3A to 3C. In FIGS. 3A to 3C, the OsO$_4$-stained PI microdomains appear dark, whereas PS, PLLA, PLDA and PLA microdomains appear bright. The results of FIGS. 3A to 3C and FIGS. 4A to 4F correspond to the results of FIG. 2, which reconfirms that the network structure of EX1 and EX2 are the alternating gyroid, and the network structure of COM1 is the alternating diamond. Further, the combined scattering and imaging results thus suggest the formation of an alternating gyroid composed of a pair of gyroid networks (a polylactide gyroid and a PI gyroid) in a PS matrix. Accordingly, the chirality effects on the self-assembly of triblock terpolymers give rise to the formation of alternating gyroid with two chiral gyroid networks, whereas the one without chiral end block results in the formation of alternating diamond without chiral network.

Figures 5A, 5B:
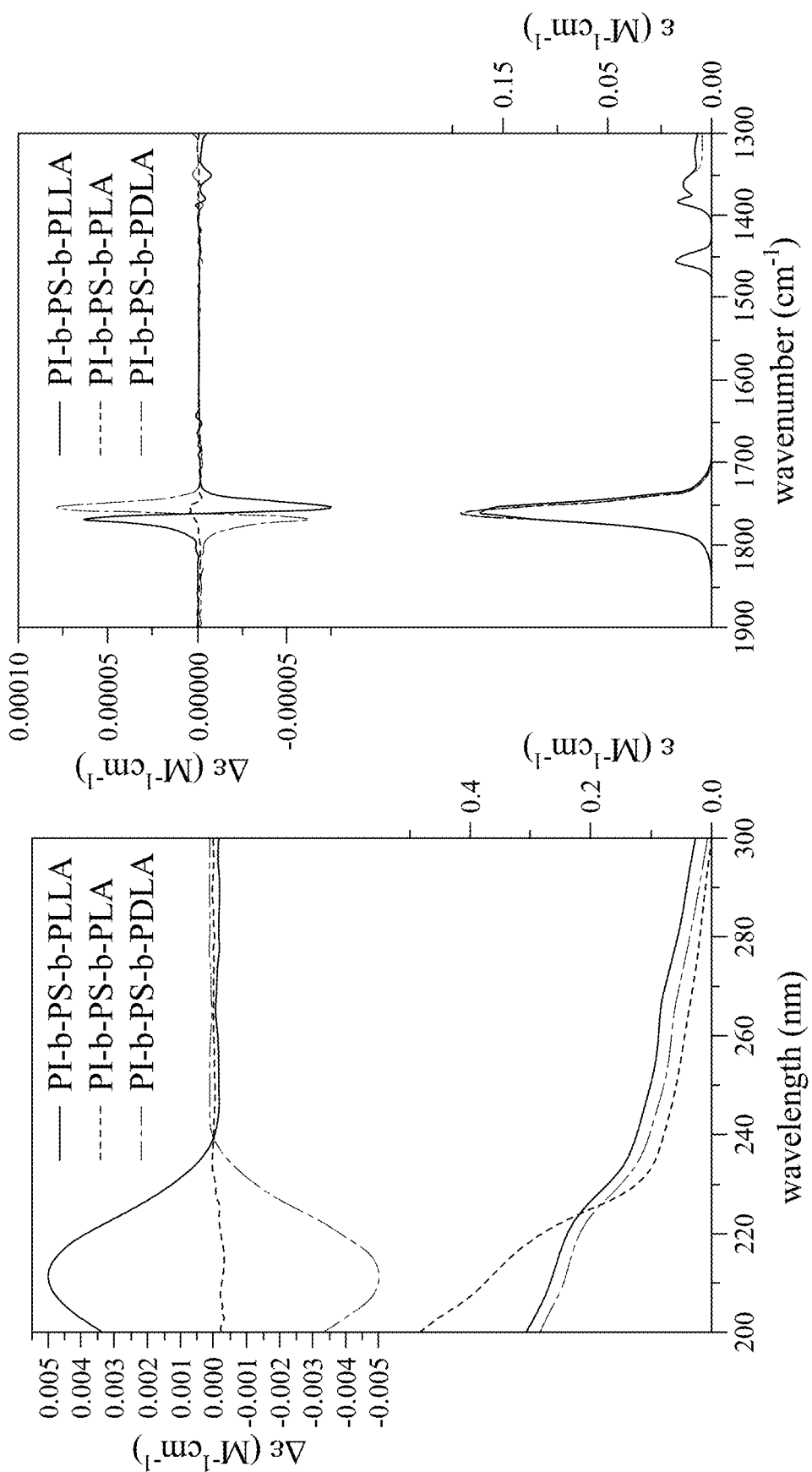
FIG. 5A is an ECD spectra of EX1, EX2 and COM1 in solution.
FIG. 5B is a VCD spectra of EX1, EX2 and COM1 in solution.

Please refer to FIGS. 5A and 5B. FIG. 5A is an ECD spectra of EX1, EX2 and COM1 in solution. FIG. 5B is a VCD spectra of EX1, EX2 and COM1 in solution. The electronic circular dichroism (ECD) is used to confirm the molecular chirality of EX1, EX2 and COM1, wherein EX1, EX2 and COM1 are dissolved in acetonitrile (AcCN) solution, respectively, and the corresponding absorption spectra can be obtained. Further, vibration circular dichroism (VCD) is used to test whether the chirality transfer from molecule to conformation occurs. The VCD spectra and corresponding absorption spectra of EX1, EX2 and COM1 are examined by dissolving the samples in dichloromethane (CH2Cl2) solution.

As shown in FIG. 5A, a positive ECD signal from the PLLA of EX1 and a negative one from the PDLA of EX2 at 220 nm can be identified, which confirms that EX1 and EX2 have opposite molecular chirality. The absorption at 220 nm is attributed to the n to π* transition of carboxylate chromophore in lactide. In contrast, the PLA of COM1 yields no ECD signal. As shown in FIG. 5B, for PLLA of EX1, a split-type Cotton effect with a negative VCD signal at 1753 cm$^{-1}$ and a positive VCD signal at 1767 cm$^{-1}$ can be found, suggesting a left-handed chain and right-handed chain conformation in the PLLA and PDLA chains, respectively. Consistently, a mirror image of EX1 in the VCD spectrum of EX2 can be clearly identified, whereas COM1 yields no VCD signal. Accordingly, the homochiral evolution from the molecular level to chain conformation can be examined in the solution state.

Figure 5D:
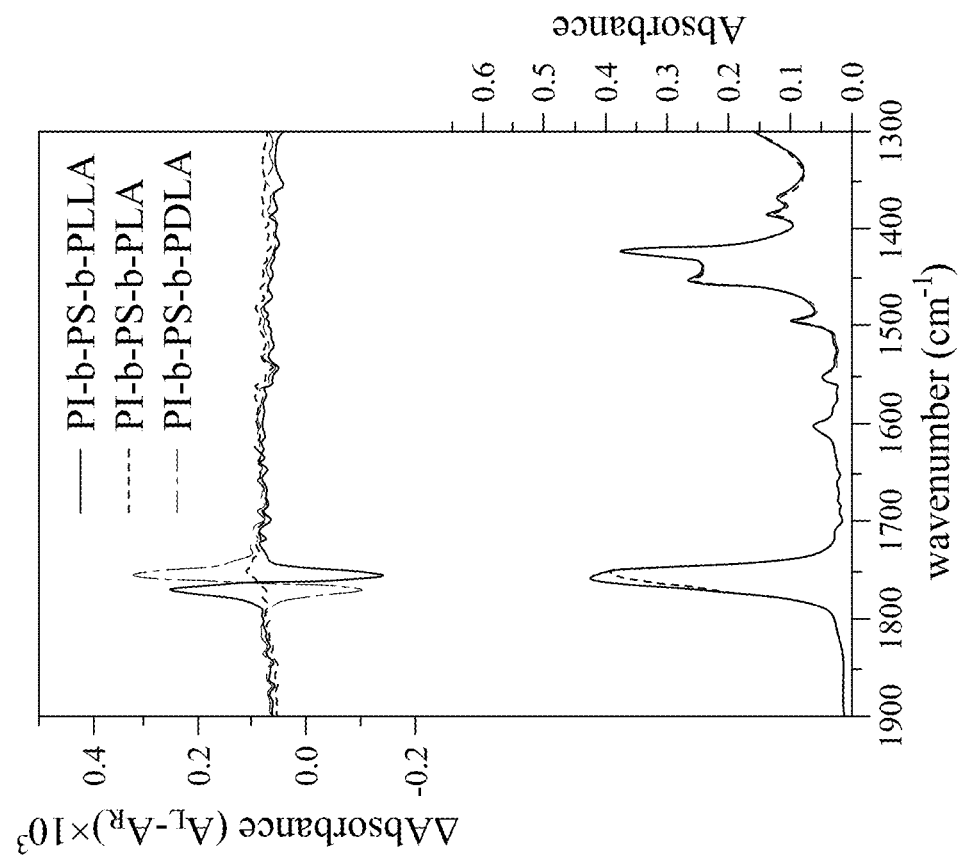
FIG. 5D is a VCD spectra of EX1, EX2 and COM1 in solid film.
Figure 5C:
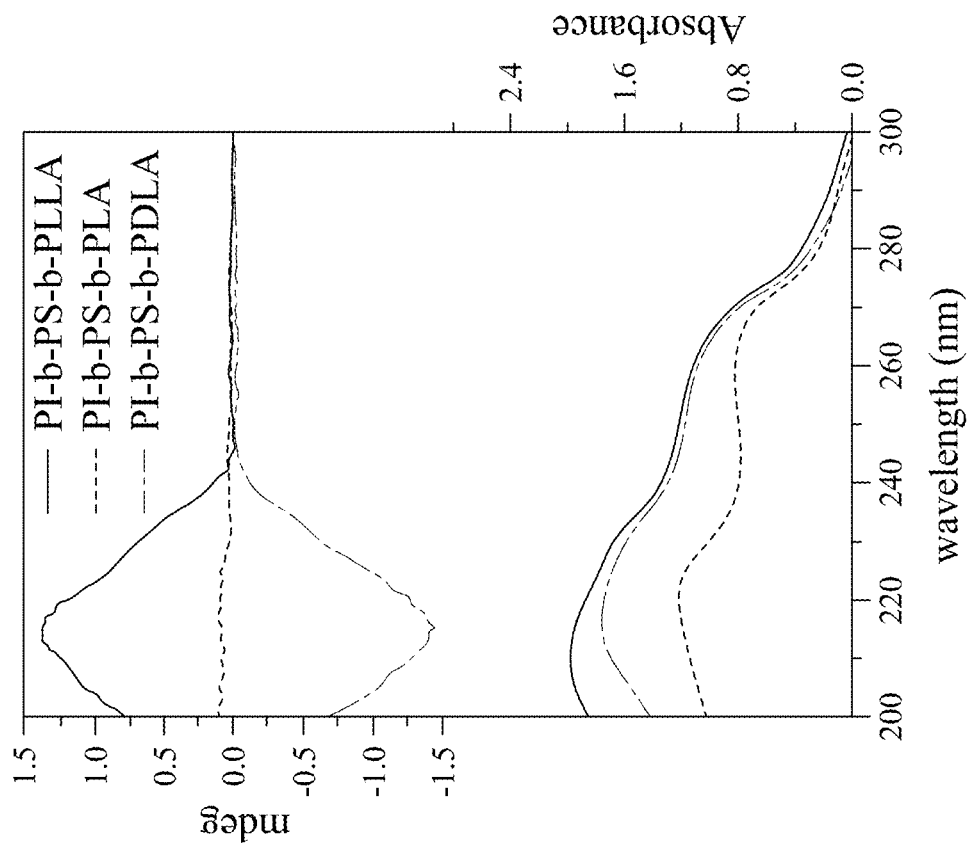
FIG. 5C is an ECD spectra of EX1, EX2 and COM1 in solid film.

Please refer to FIGS. 5C and 5D. FIG. 5C is an ECD spectra of EX1, EX2 and COM1 in solid film. FIG. 5D is a VCD spectra of EX1, EX2 and COM1 in solid film. To investigate the suggested homochiral evolution from conformational to hierarchical chirality, solid-film samples of EX1, EX2 and COM1 are prepared for the spectroscopic examination.

As shown in FIGS. 5C and 5D, similar to the results in the solution state, the opposite Cotton effects in the ECD spectra and the opposite split-type Cotton effects in the VCD spectra can be found from the solid films of EX1 and EX2, and no ECD and VCD signals in the solid film of EX1. As a result, the homochiral evolution from the molecular level to chain conformation can also be examined in the solid state. These results suggest that the polylactide microdomains will be constructed by the chains with preferred helicity.

Figure 6A:
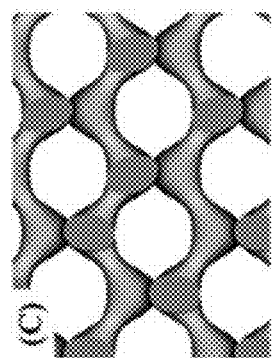
FIG. 6A is a simulated image of the PI gyroid of EX1.
Figure 6B:
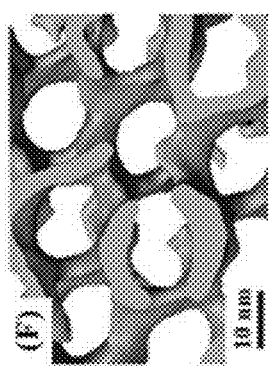
FIG. 6B is a simulated image of the PI gyroid of EX2.
Figure 6C:
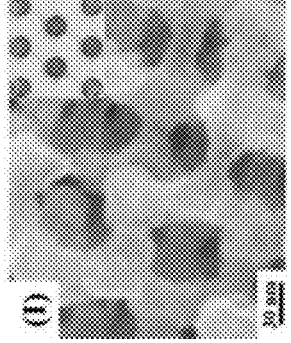
FIG. 6C is a simulated image of the PI gyroid of COM1.
Figure 6D:
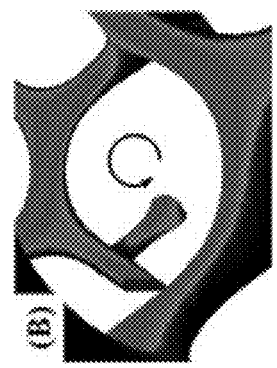
FIG. 6D is a 3D reconstruction from electron tomography of the PI gyroid of EX1.
Figure 6E:
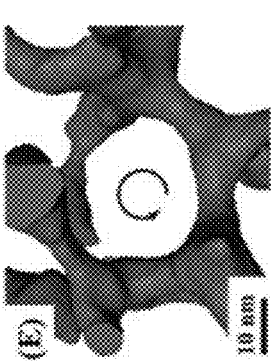
FIG. 6E is a 3D reconstruction from electron tomography of the PI gyroid of EX2.
Figure 6F:
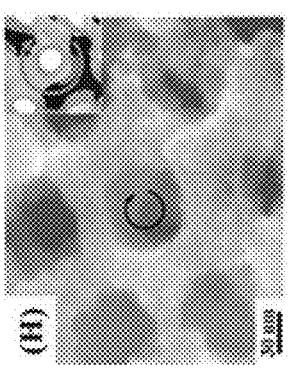
FIG. 6F is a 3D reconstruction from electron tomography of the PI gyroid of COM1.
Figure 6G:
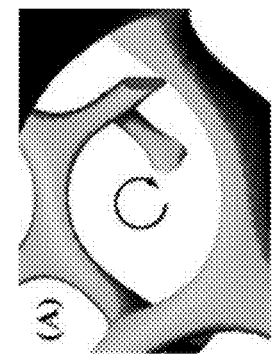
FIG. 6G is a FESEM image of EX1 after templating.
Figure 6H:
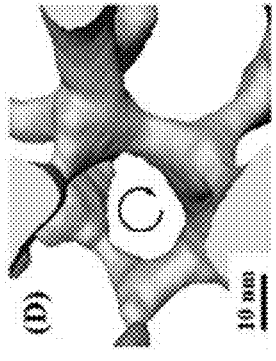
FIG. 6H is a FESEM image of EX2 after templating.
Figure 6I:
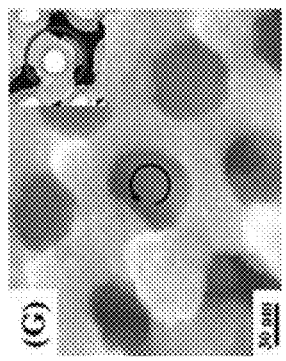
FIG. 6I is a FESEM image of COM1 after templating.

Please refer to FIGS. 6A to 6I. FIG. 6A is a simulated image of the PI gyroid of EX1. FIG. 6B is a simulated image of the PI gyroid of EX2. FIG. 6C is a simulated image of the PI gyroid of COM1. FIG. 6D is a 3D reconstruction from electron tomography of the PI gyroid of EX1. FIG. 6E is a 3D reconstruction from electron tomography of the PI gyroid of EX2. FIG. 6F is a 3D reconstruction from electron tomography of the PI gyroid of COM1. FIG. 6G is a FESEM image of EX1 after templating. FIG. 6H is a FESEM image of EX2 after templating. FIG. 6I is a FESEM image of COM1 after templating.

Specifically, a TEM image is a 3D image projected on a 2D plane. However, the chirality of gyroid from self-assembly of block copolymers is difficult to be directly determined from conventional TEM images (2D projections) due to the complicated morphology for the projection of network phase. Instead, electron tomography (3D TEM) can be used to visualize real-space morphologies by tomographic technology. PI gyroid of EX1 with the right-handed helical path can be found in FIG. 6A similar to the 3D reconstruction image of stained PI microdomain shown in FIG. 6D. PI gyroid of EX2 with the left-handed helical path can be found in FIG. 6B similar to the 3D reconstruction image of stained PI microdomain shown in FIG. 6E. By contrast, as shown in FIGS. 6C to 6F, the reconstruction results suggest the formation of an achiral PI diamond with tetrapod network in COM1.

As shown in FIGS. 6G to 6I, in order to further examine the network structure, EX1, EX2 and COM1 are templated, respectively. In detail, with the replacement of Ni for the polylactide microdomain, the single gyroid Ni network could be directly observed by field emission scanning electron microscopy (FESEM) after removal of the template by calcination. As shown in FIG. 6G, the left-handed locus can be identified in the template fabricated from EX1. As shown in FIG. 6H, the right-handed locus can be identified in the template fabricated from EX2. By contrast, an achiral network structure is found in the template fabricated from COM1.

Figure 7A:
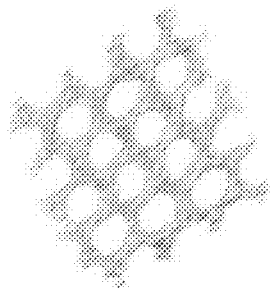
FIG. 7A is a reconstructed image of the PI gyroid of EX1.
Figure 7B:
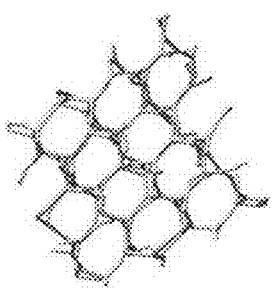
FIG. 7B is an extracted skeleton image of FIG. 7A.
Figure 7C:
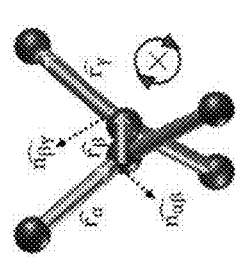
FIG. 7C is a 3D schematic view of the PI gyroid from a single grain of EX1.
Figure 7D:
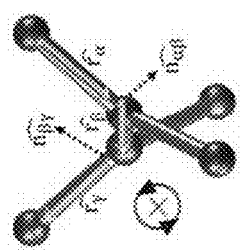
FIG. 7D is a 3D schematic view of the PI gyroid from a single grain of EX2.
Figure 7E:
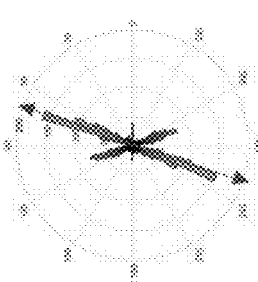
FIG. 7E is a polar histogram of torsion angle distribution for PI gyroid of EX1.
Figure 7F:
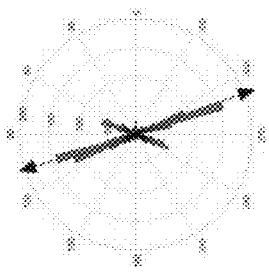
FIG. 7F is a polar histogram of torsion angle distribution for PI gyroid of EX2.

Please refer to FIGS. 7A to 7F. FIG. 7A is a reconstructed image of the PI gyroid of EX1. FIG. 7B is an extracted skeleton image of FIG. 7A. FIG. 7C is a 3D schematic view of the PI gyroid from a single grain of EX1. FIG. 7D is a 3D schematic view of the PI gyroid from a single grain of EX2. FIG. 7E is a polar histogram of torsion angle distribution for PI gyroid of EX1. FIG. 7F is a polar histogram of torsion angle distribution for PI gyroid of EX2. Specifically, based on measurements of the torsion angles, the determination of chirality of EX1 and EX2 is feasible.

As shown in FIGS. 7A and 7B, to apply this analysis, the PI gyroid from a single grain of EX1 and EX2 are reconstructed by 3D TEM. As shown in FIGS. 7C and 7D, torsion angle is defined as the angle between two normals ($\widetilde{n_{\alpha\beta}}$ and $\widetilde{n_{\beta\gamma}}$) of every three consecutive edges ($r_\alpha$, $r_\beta$ and $r_\gamma$). For a perfect gyroid network, the values for torsion angles of the reconstructed PI gyroid in the PI-b-PS-b-PLLA are at 70.5° and 250.5°. For a perfect gyroid network, the values for torsion angles of the reconstructed PI gyroid in the PI-b-PS-b-PDLA are at −70.5° and −250.5°. In FIGS. 7E and 7F, on the basis of ten-set reconstructed monograins at which more than 100 datasets per grain (more than 1000 torsion angle measurement) were acquired for each enantiomeric sample synthesized. As shown in FIG. 7E, the most frequent values for the torsion angle distribution of the reconstructed PI gyroid in the PI-b-PS-b-PLLA are approximately at 70° and 250°. As shown in FIG. 7F, the most frequent values for the torsion angle distribution of the reconstructed PI gyroid in the PI-b-PS-b-PDLA are approximately at −70° and −250°. Accordingly, the PI gyroid of EX1 can be meaningfully referred to as right-handed, and the PI gyroid of EX2 can be meaningfully referred to as left-handed. Hence, the PLLA gyroid of EX1 can be meaningfully referred to as left-handed, and the PDLA gyroid of EX2 can be meaningfully referred to as right-handed.

Accordingly, the above analysis confirms that the nanonetwork with controlled chirality of present disclosure has an exclusive chirality, and the chirality of the nanonetwork with controlled chirality of present disclosure can be controlled by the homochiral characteristic of the block. Further, by taking advantage of the homochiral evolution from monomer to multi-chain domain morphology through self-assembly, the structure with preferred chiral sense can be induced, and the nanonetwork with controlled chirality can be achieved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A nanonetwork with controlled chirality prepared via self-assembly of triblock terpolymers, wherein each of the triblock terpolymers comprises a first block, a second block and a third block, the first block is connected to the second block, the third block is connected to the second block, wherein the first block, the second block and the third block are incompatible, the third block has a homochiral characteristic, and a chirality of the nanonetwork with controlled chirality is determined by the homochiral characteristic;
wherein a volume fraction of the first block is 0.14-0.16, a volume fraction of the second block is 0.34-0.36, a volume fraction of the third block is 0.48-0.52, and the nanonetwork with controlled chirality is an alternating gyroid.

2. The nanonetwork with controlled chirality of claim 1, wherein the first block is polyisobutylene, polypropylene, polyisoprene, polyethylene, polybutadiene or polyoxypropylene.

3. The nanonetwork with controlled chirality of claim 1, wherein the second block is poly(2-chloro-1,3-butadiene), poly(isobutyl acrylate), poly(butyl vinyl ether), polystyrene, poly(methyl vinyl ether), poly(ethyl methacrylate), poly(α-methylstyrene), poly(2-ethoxyethyl methacrylate), poly(vinyl propionate), poly(vinyl butyrate) or poly(propyl acrylate).

4. The nanonetwork with controlled chirality of claim 1, wherein the nanonetwork with controlled chirality has a nanochannel, and a diameter of the nanochannel is 8 nm to 30 nm.

5. The nanonetwork with controlled chirality of claim 1, wherein the first block forms a first gyroid in the nanonetwork with controlled chirality, the third block forms a second gyroid in the nanonetwork with controlled chirality, the second gyroid is intertwined with the first gyroid, and the second block serves as a matrix component for the first gyroid and the second gyroid.

6. A method for manufacturing the nanonetwork with controlled chirality of claim 1, the method comprising:
providing the triblock terpolymers; and
adding the triblock terpolymers in a solvent, wherein the triblock terpolymers self-assemble in the solvent during evaporation to form the nanonetwork with controlled chirality.

7. The method of claim 6, wherein the solvent is dichloromethane, toluene or chloroform.

* * * * *